(12) United States Patent
Ivanovic et al.

(10) Patent No.: US 7,634,389 B2
(45) Date of Patent: Dec. 15, 2009

(54) REFLECTIVITY OPTIMIZATION FOR MULTILAYER STACKS

(75) Inventors: Lav Ivanovic, Cupertino, CA (US); Nicholas Eib, San Jose, CA (US); Xudong Xu, San Jose, CA (US)

(73) Assignee: LSI Corporation, Milpitas, CA (US)

( * ) Notice: Subject to any disclaimer, the term of this patent is extended or adjusted under 35 U.S.C. 154(b) by 623 days.

(21) Appl. No.: 10/718,824

(22) Filed: Nov. 21, 2003

(65) Prior Publication Data

US 2005/0114094 A1    May 26, 2005

(51) Int. Cl.
*G06F 7/60* (2006.01)
*H01L 21/00* (2006.01)
*H01L 21/469* (2006.01)
*G06F 19/00* (2006.01)

(52) U.S. Cl. ............... 703/2; 438/74; 438/761; 700/121

(58) Field of Classification Search ............... 703/2; 438/74, 761; 700/121
See application file for complete search history.

(56) References Cited

OTHER PUBLICATIONS

"IMD- Software for modeling the optical properties of multilayer films", David L. Windt, Bell Laboratories, Murray Hill, New Jersey. Mar. 31, 1998.*
"Optical Analysis of Complex Multilayer Structures Using Multiple Data Types", Blaine Johs, et al. Optical Interference Coating, SPIE vol. 2253, 1994.*
"Optical Lithography Simulation and Photoresist Optimization for Photomask Fabrication", Benjamin M. Rathsack et al. Department of Chemical Engineering, The University of Texas at Austin. May 1999.*
"Pattern recognition by an optical thin-film multilayer model", Xiaodong Li and Martin Purvis. Annals of Mathematics and Artificial Intelligence, 1999.*
* cited by examiner

*Primary Examiner*—Paul L Rodriguez
*Assistant Examiner*—Nithya Janakiraman
(74) *Attorney, Agent, or Firm*—William W. Cochran; Cochran Freund & Young LLC

(57) ABSTRACT

A method for obtaining an optimal reflectivity value for complex multilayer stacks is disclosed. Aspects of the present invention include generating a model of a multilayer stack and parameterizing each layer by a thickness and an index of refraction; allowing a user to input values for the parameters; calculating an extrema for a cost function of reflectivity R using the input parameter values; calculating sensitivity values S for the extrema points; and obtaining an optimal value by calculating a cost function R+S.

18 Claims, 6 Drawing Sheets

Define parameters

(k – imaginary part of refractive index)

Layer 1. Nick-resist

| | vary | current | min | max | step |
|---|---|---|---|---|---|
| t | ☐ | 460 | 414.0 | 506.0 | 0 |
| n | ☐ | 1.86 | 1.674 | 2.046 | 0 |
| k | ☐ | 0.015358 | 0.0138222 | 0.0168938 | 0 |

Layer 2. Nick-SiO2

| | vary | current | min | max | step |
|---|---|---|---|---|---|
| t | ■ | 60 | 54.0 | 66.0 | 0 |
| n | ☐ | 1.563177 | 1.4068593 | 1.7194947 | 0 |
| k | ☐ | 0 | 0.0 | 0.0 | 0 |

Layer 3. Nick-SiON

| | vary | current | min | max | step |
|---|---|---|---|---|---|
| t | ■ | 50 | 45.0 | 55.0 | 0 |
| n | ■ | 1.8 | 1.72 | 1.88 | 0 |
| k | ■ | 0.2 | 0.1 | 0.3 | 0 |

Layer 4. Nick-ILD

| | vary | current | min | max | step |
|---|---|---|---|---|---|
| t | ■ | 490 | 480.0 | 500.0 | 0 |
| n | ☐ | 1.47 | 1.323 | 1.617 | 0 |
| k | ■ | 0.05 | 0.0 | 0.1 | 0 |

Layer 5. Nick-Si3N4

[ OK ]   [ Cancel ]

FIG. 5

REFLECTIVITY OPTIMIZATION FOR MULTILAYER STACKS

FIELD OF THE INVENTION

The present invention relates to lithography optimization techniques, and more particularly to a method for obtaining an optimal reflectivity value for complex multilayer stacks.

BACKGROUND OF THE INVENTION

Photolithography is a lithographic technique used to transfer the design of circuit paths and electronic elements of a chip onto a wafer's surface. A photomask is created with the design for each layer of the board or wafer (chip). The board or wafer is coated with a light-sensitive film (photoresist) that is hardened when exposed to light shining through the photomask. The board or wafer is then exposed to an acid bath (wet processing) or hot ions (dry processing), and the unhardened areas are etched away.

Ideally, the photoresist pattern produced by the photolithography process and the substrate pattern produced by the subsequent etch process would precisely duplicate the pattern on the photomask. For a variety of reasons, however, the photoresist pattern remaining after the resist develop step may vary from the pattern of the photomask significantly.

For example, many of the integrated circuit elements formed on the wafer's surface comprise multiple layers of thin film, interferences from which can result in critical dimension (CD) variation. The interferences are mainly caused by the reflectivity from resist top and bottom interfaces, and can lead to the existence of standing waves and CD swing curves.

FIG. 1 is a cross-sectional view of an incident of a light beam shown on a film stack shown during lithography. The light 10 shines through the resist 12, which is also referred to as the ambient, to the film stack 14. A portion of the light 18 passes through the film stack 14 into the substrate 16, another portion of the light 20 is reflected from the surface of the stack 14, and yet another portion of light 22 is reflected at boundaries between the layers in the stack 14. Optical functions, such as reflectivity of layer boundaries, can be computed by a set of parameters that include light wavelength, thickness of the stack layers, and a complex index of refractivity for the ambient, substrate, and each film layer.

The optimization for the lithography application typically involves the minimization or maximization of reflectivity. The optimization can be carried out by finding values for the parameters that cause a cost function of reflectivity to yield an optimal value. It is difficult or very time consuming to obtain an optimal value for complex multilayer stacks 14.

Software programs are available that simulate lithography process steps and parameters. PROLITH™ by KLA-Tencor Corporation of San Jose, Calif. is an example of a standard lithography simulation program. PROLITH is capable of aerial image and three-dimensional resist image predictions. Although current lithography simulation programs, such as PROLITH, help lithographers reduce process development and process optimization times, such programs have limitations. PROLITH, for example, performs the reflectivity minimization calculation by fixing two variables and finding the minimum of the function using the remaining variables. Two other variables are fixed, and the process is repeated for each layer. Thus, using conventional lithography simulation programs is a very iterative and time consuming process. In addition, results are not usually very accurate.

Accordingly, what is needed is an improved method for obtaining an optimal reflectivity value for complex multilayer stacks. The present invention addresses such a need.

SUMMARY OF THE INVENTION

The present invention provides a method for obtaining an optimal reflectivity value for complex multilayer stacks. Aspects of the present invention include generating a model of a multilayer stack and parameterizing each layer by a thickness and an index of refraction; allowing a user to input values for the parameters; calculating an extrema for a cost function of reflectivity R using the input parameter values; calculating sensitivity values S for the extrema points; and obtaining an optimal value by calculating a cost function R+S.

According to the method and system disclosed herein, the present invention provides a method for obtaining an optimal reflectivity value for complex multilayer stacks that is capable of performing the calculation using multiple variables. In addition, the method is faster and more accurate than prior methods.

BRIEF DESCRIPTION OF THE DRAWINGS

FIG. 5 is a diagram showing a parameter value input screen for the reflectivity optimization.

DETAILED DESCRIPTION OF THE INVENTION

The present invention relates to obtaining an optimal reflectivity value for complex multilayer stacks. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

The present invention provides a computer-implemented method for obtaining an optimal reflectivity value for a complex multilayer stack during lithography simulation. In a preferred embodiment, the present invention is implemented as a program that is separate, or part, of a lithography simulation program, and is executed on a conventional workstation, PC, or server.

Figure 1:
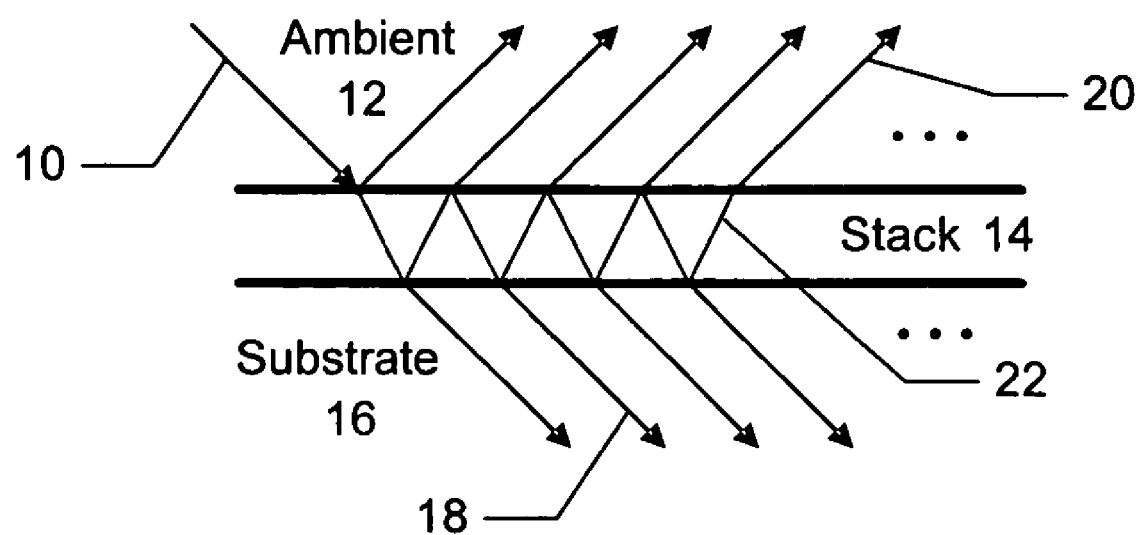
FIG. 1 is a cross-sectional view of an incident of a light beam shown on a film stack shown during lithography.
Figure 2:
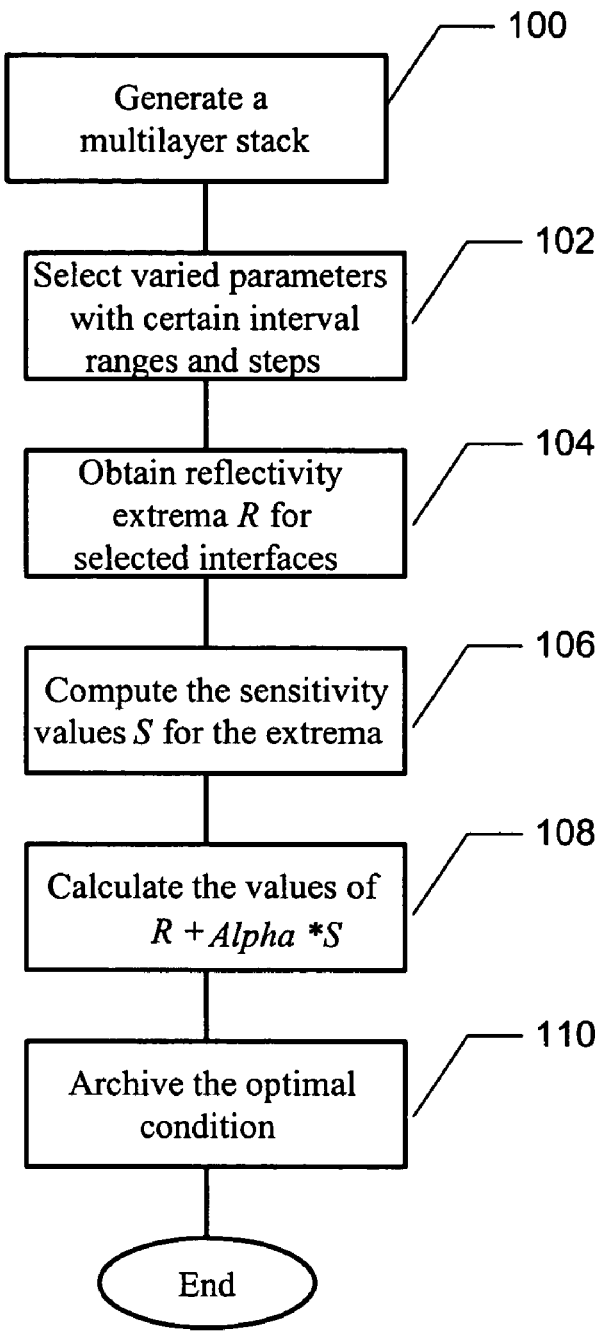
FIG. 2 is a flow diagram illustrating the process of obtaining an optimal reflectivity value for a complex multilayer stack in accordance with a preferred embodiment of the present invention.

FIG. 2 is a flow diagram illustrating the process of obtaining an optimal reflectivity value for a complex multilayer stack in accordance with a preferred embodiment of the present invention. The process begins in step 100 by generating a model of a multilayer stack by adding layers of material on top of a substrate material, and parameterizing each layer by a thickness and an index of refraction in order to compute the optical functions.

Figure 3:
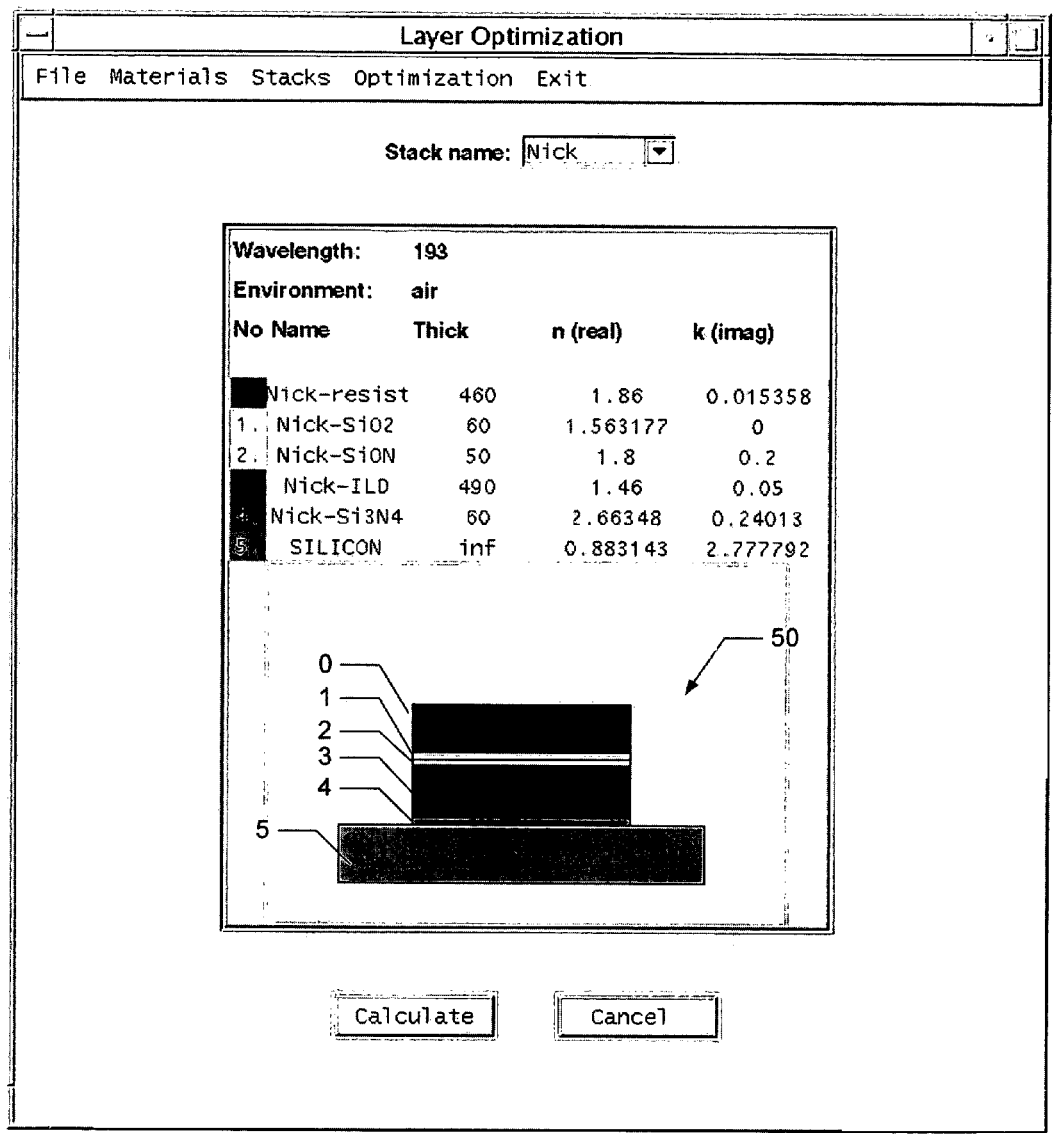
FIG. 3 is a diagram illustrating an example modeled stack.

FIG. 3 is a diagram illustrating an example modeled stack 50. A stack may comprise N layers. However, in the example shown, stack 50 comprises a total of 6 layers: a top ambient resist layer 0 followed by four layers of materials (1, 2, 3, and 4) patterned over a substrate layer 5. For purposes of example, the materials comprising layers 1-4 are SiO2, SiOn, ILD, and Si3N4, respectively. All layers, ambient and substrate are supposed to be homogeneous, with abrupt and parallel border interfaces. Well-known Fresnel equations are calculated at normally incident plane wave with monochromatic illumination.

Figure 4:
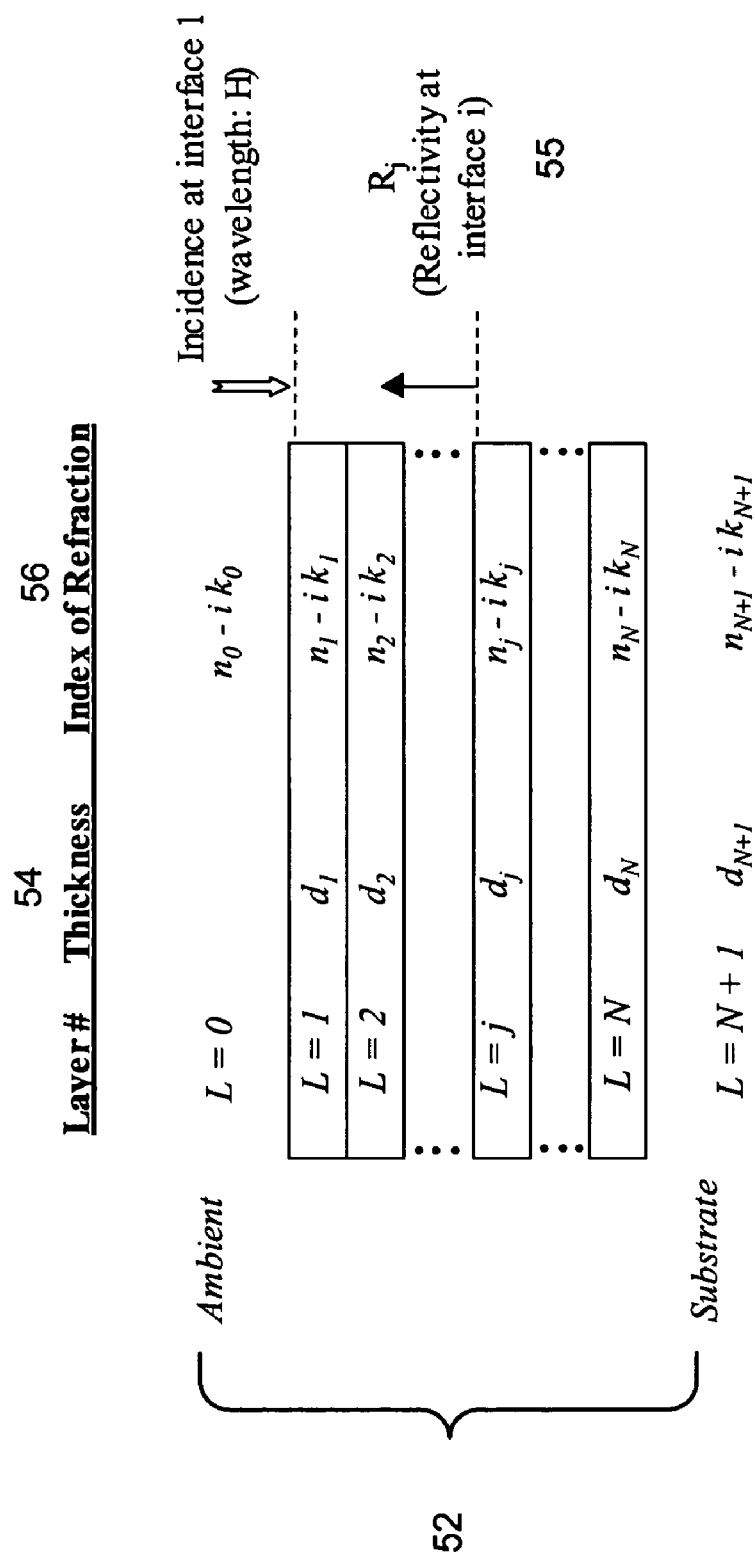
FIG. 4 is a diagram illustrating the parameters of the multilayer stack.

FIG. 4 is a diagram illustrating the parameters of the multilayer stack 50. Assume that the multilayer stack comprises of N layers (L=1, 2, 3, . . . , N). Each layer 52 is parameterized by a thickness 54 and an index of refraction 56 (which includes a real and an imaginary number), including the ambient resist layer 0 and the substrate layer N+1. The $j^{th}$ layer has thickness $d_j$, and complex index of refraction $n_j=n_j-ik_j$, as shown. The ambient and substrate, which are above and below the multilayer stack, have complex indexes of refraction: $n_0=n_0-ik_0$ and $n_{N+1}=n_{N+1}-ik_{N+1}$, respectively.

The reflectivity 55 at an interface between two layers 52 can be defined as a cost function. For example, the reflectivity 55 at the $j^{th}$ interface (between the $(j-1)^{th}$ and $j^{th}$ layers) is $R_j$, is a function of $3(N-j+1)+4$ parameters, which are: $n_{j-1}$, $n_j$ . . . $n_N$, $n_{N+1}$; $k_{j-1}$, $k_j$ . . . $k_N$, $k_{N+1}$; $d_j$, $d_{j+1}$ . . . $d_N$. For lithography applications, the resist is usually on the top layer of multilayer stacks so that the cost functions ($R_1$ and $R_2$) are the reflectivity from the top and bottom of the resist. They can have 3N+4 and 3N+1 independent parameters, respectively.

Based on practical problems, the cost functions can be evaluated and calculated by fixing some parameters and varying others. Local extrema (minima or maxima) of the cost functions of reflectivity for these multidimensional cases with defined feasible ranges may be solved by a well-known variable neighborhood method.

Referring again to FIG. 2, after the stack 50 has been modeled, in step 102, the user inputs values for the parameters, including range and step values. FIG. 5 is a diagram showing a parameter value input screen for the reflectivity optimization. The user may first enter values for the thickness 54 and the complex indexes of refraction (n and k) 56 and 58 for each layer 52. The values include a current starting point 60, a minimum values 62, and a maximum value 64. The user also chooses which of the parameters will be independent variables with feasible intervals by clicking the "Vary" button 59 and inputting a step value 66. Those parameters that are not designated as varying will be fixed. According to one aspect of the present invention, the user may vary any number of parameters. The user also chooses a particular layer for the reflectivity calculation (not shown).

Referring again to FIG. 2, after the user has input parameter values, in step 104, the extrema (min and max) for the cost function of reflectivity R is calculated for the top of the selected layer interface using the input parameter values.

Since the variability in film stacks in semiconductor processing can lead to a variation of the parameters, the sensitivity of reflectivity to the parameters has to be taken into consideration in order to find an optimal condition. Therefore, in step 106, all sensitivity values S for the extrema points are calculated. The sensitivity is defined as S=(Max R−Min R) with all varied parameters, which represents how reflectivity values react to the variation of variables. The larger sensitivity, the higher magnitude of change of reflectivity should be. Smaller sensitivity values are preferred since the variation of thickness and refractive coefficients of materials results in smaller fluctuation of reflectivity.

Figure 6:
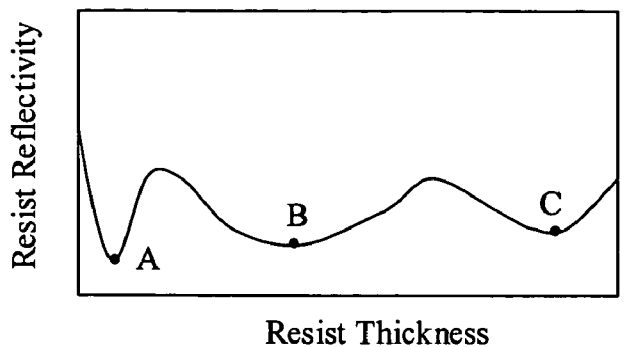
FIG. 6 is a graph illustrating example sensitivity values for a cost function.

FIG. 6 is a graph illustrating example sensitivity values for a cost function. The global minimum value for the function is point A, but the responding sensitivity is high. The global minimum value for the reflectivity is point A, but the responding sensitivity in that point is high. Point B is an optimal point because the sensitivity value is much smaller than the value at point A though the reflectivity value is slight higher. In order to obtain the most favorable solution, another cost function, $R+\alpha \cdot S$, is computed in a preferred embodiment, in which $\alpha$ is a weighted parameter for sensitivity in the cost function. The larger alpha value, the more important the sensitivity is.

Referring again to FIG. 2, after the sensitivity values are calculated, in step 108, a value for the cost function $R+\alpha \cdot S$ is calculated, from which an optimal value is obtained in step 110. The choice of the best optimal point also may depend upon other process considerations such as etch requirements.

The simulation of reflectivity for a multilayer film stack was validated using experimental CD swing results since the resist CD swing curve is controlled by the refection of light at the resist boundaries. For the experiment, a film stack comprising the following layers was used:

Ambient: air

Layer #1: DP630, thickness=290-600 nm

Layer #2: SiON, thickness=120 nm

Layer #3: Black Diamond, thickness=770 nm

Layer #4: SiCO, thickness=50 nm

Substrate: Cu

Figure 7A:
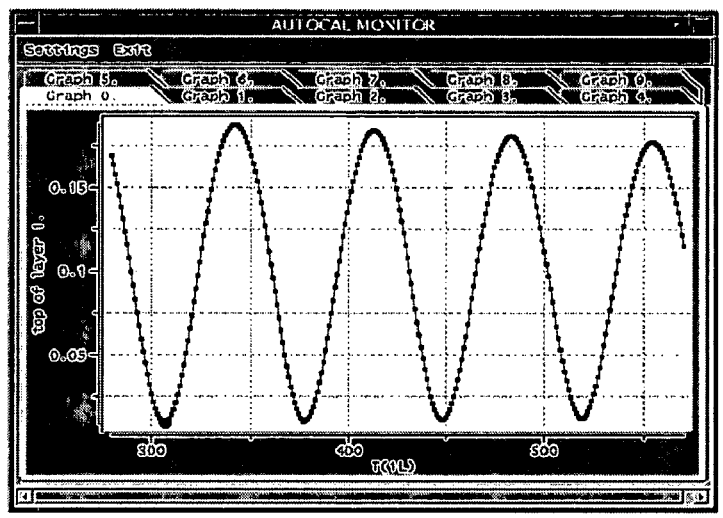
FIGS. 7A and 7B are diagrams showing an example reflectivity simulation and experimental CD swing curve as a function of resist thickness.
Figure 7B:
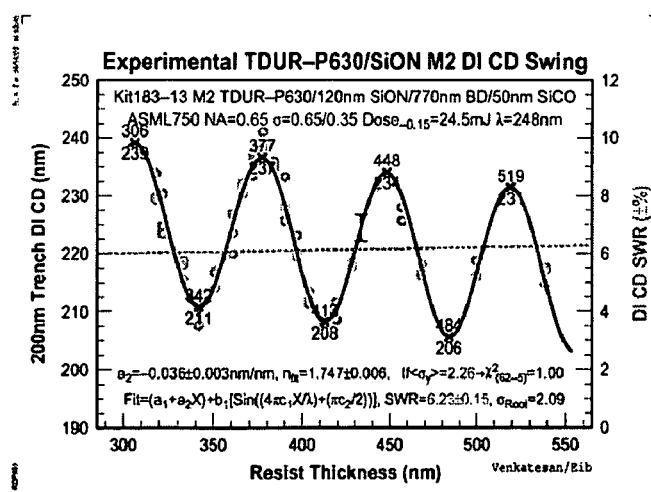

In addition, the illumination wavelength is 248 nm. The reflectivity simulation and experimental CD curve as a function of resist thickness are shown in FIGS. 7A and 7B, respectively. The Standing Wave Ratio (SWR) is defined as (CD maximum−CD minimum)/(CD maximum+CD minimum)*100. A lower SWR means lower developed resist CD variation due to resist thickness and substrate variation. The agreement between reflectivity simulation and experiment is excellent. The simulated reflectivity minima correspond to the bright field experimental developed resist CD maximums and the simulated reflectivity maxims correspond to the experimental developed resist CD minima. The extrema locations are quantified in Table 1.

TABLE 1

| Resist values at extremum points | |
|---|---|
| Experiment (nm) | Simulation (nm) |
| 342 | 342 |
| 378 | 378 |
| 413 | 413 |
| 448 | 448 |
| 484 | 485 |
| 519 | 518 |

A method for obtaining an optimal reflectivity value for complex multilayer stacks has been disclosed that is capable of performing the reflectivity calculation using multiple variables at once. In addition, the method is faster and more accurate than prior methods.

The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

We claim:

1. A method for obtaining an optimal reflectivity value for a complex multilayer stacks implemented as a lithography simulation program executed on a computer, comprising:
   (a) generating a model of a simulated multilayer stack prior to production of the multilayer stack and parameterizing each layer by providing parameters, the parameters including a thickness and an index of refraction;
   (b) receiving from a user input values for the parameters, including a designation of an unrestricted number of the parameters as independent variables;
   (c) calculating an extrema for a cost function of reflectivity R using the input parameter values;
   (d) calculating sensitivity values S for the extrema;
   (e) obtaining the optimal reflectivity value for the simulated multilayer stack by calculating a cost function $R+\alpha \cdot S$ using the independent variables at once, wherein $\alpha$ is a weighted parameter for the sensitivity values in the cost function; and
   (f) using the optimal reflectivity value to one of minimize and maximize reflectivity of at least one layer boundary in the multilayer stack to reduce resist critical dimension (CD) variation and improve accuracy of a lithography process.

2. The method of claim 1 wherein the generating (a) further comprises: providing the model of the simulated multilayer stack with N layers, where a top layer comprises a top ambient resist layer followed by one or more layers of materials that are patterned over a substrate layer.

3. The method of claim 2 wherein the generating (a) further comprises: providing the index of refraction to include a real and an imaginary number.

4. The method of claim 3 wherein the generating (a) further comprises: providing a $j^{th}$ layer with thickness $d_j$, and a complex index of refraction $n_j=n_j-ik_j$.

5. The method of claim 4 wherein the generating (a) further comprises: providing the ambient and substrate with complex indexes of refraction: $n_0=n_0-ik_0$ and $n_{N+1}=n_{N+1}-ik_{N+1}$, respectively.

6. The method of claim 5 wherein the generating (a) further comprises: defining reflectivity at an interface between two layers as a cost function, wherein the reflectivity $R_j$ at a $j^{th}$ interface (between the $(j-1)^{th}$ and $j^{th}$ layers) is a function of $3(N-j+1)+4$ parameters, which are; $n_{j-1}, n_j \ldots n_N, n_{N+1}; k_{j-1}, k_j \ldots k_N, k_{N+1}; d_j, d_{j+1} \ldots d_N$.

7. The method of claim 1 wherein (b) further comprises: receiving from the user values for the thickness and the complex indexes of refraction (n and k) for each layer, including a current starting point, a minimum value, and a maximum value for the thickness and the complex indexes of refraction for each layer.

8. The method of claim 7 wherein (b) further comprises: receiving from the user step values for the parameters designated as independent variables, wherein those parameters that are not designated as independent variables are fixed.

9. The method of claim 1 wherein the obtaining (e) further comprises: defining the sensitivity as $S=(Max\ R-Min\ R)$ for all varied parameters.

10. A computer-readable medium containing program instructions for obtaining an optimal reflectivity value for a complex multilayer stack implemented as a lithography simulation program for execution on a computer, the instructions for:
    (a) generating a model of a simulated multilayer stack prior to production of the multilayer stack and parameterizing each layer by providing parameters, the parameters including a thickness and an index of refraction;
    (b) receiving from a user input values for the parameters, including a designation of an unrestricted number of parameters as independent variables;
    (c) calculating an extrema for a cost function of reflectivity R using the input parameter values;
    (d) calculating sensitivity values S for the extrema;
    (e) obtaining the optimal reflectivity value for the simulated multilayer stack by calculating a cost function $R+\alpha \cdot S$ using the independent variables at once, wherein $\alpha$ is a weighted parameter for the sensitivity values in the cost function; and
    (f) using the optimal reflectivity value to one of minimize and maximize reflectivity of at least one layer boundary in the multilayer stack to reduce resist critical dimension (CD) variation and improve accuracy of a lithography process.

11. The computer-readable medium of claim 10 wherein instruction (a) further comprises: providing the model of the multilayer stack with N layers, where a top layer comprises a top ambient resist layer followed by one or more layers of materials that are patterned over a substrate layer.

12. The computer-readable medium of claim 11 wherein instruction (a) further comprises: providing the index of refraction to include a real and an imaginary number.

13. The computer-readable medium of claim 12 wherein instruction (a) further comprises: providing a $j^{th}$ layer with thickness $d_j$, and a complex index of refraction $n_j=n_j-ik_j$.

14. The computer-readable medium of claim 13 wherein instruction (a) further comprises: providing the ambient and substrate with complex indexes of refraction: $n_0=n_0-ik_0$ and $n_{N+1}-ik_{N+1}$, respectively.

15. The computer-readable medium of claim 14 wherein instruction (a) further comprises: defining reflectivity at an interface between two layers as a cost function, wherein the reflectivity $R_j$ at a $j^{th}$ interface (between the $(j-1)^{th}$ and $j^{th}$ layers) is a function of $3(N-j+1)+4$ parameters, which are; $n_{j-1}, n_j \ldots n_N, n_{N+1}; k_{j-1}, k_j \ldots k_N, k_{N+1}; d_j, d_{j+1} \ldots d_N$.

16. The computer-readable medium of claim 10 wherein instruction (b) further comprises: receiving from the user values for the thickness and the complex indexes of refraction (n and k) for each layer, including a current starting point, a minimum value, and a maximum value for the thickness and the complex indexes of refraction for each layer.

17. The computer-readable medium of claim 16 wherein instruction (b) further comprises: receiving from the user step values for the parameters designated as independent variables, wherein those parameters that are not designated as independent variables are fixed.

18. The computer-readable medium of claim 10 wherein instruction (e) further comprises: defining the sensitivity as $S=(Max\ R-Min\ R)$ for all varied parameters.

* * * * *